Feb. 3, 1953 — V. H. RICHARDS — 2,627,234
DOLLY TRUCK AND THE LIKE
Filed Aug. 27, 1945 — 2 SHEETS—SHEET 2

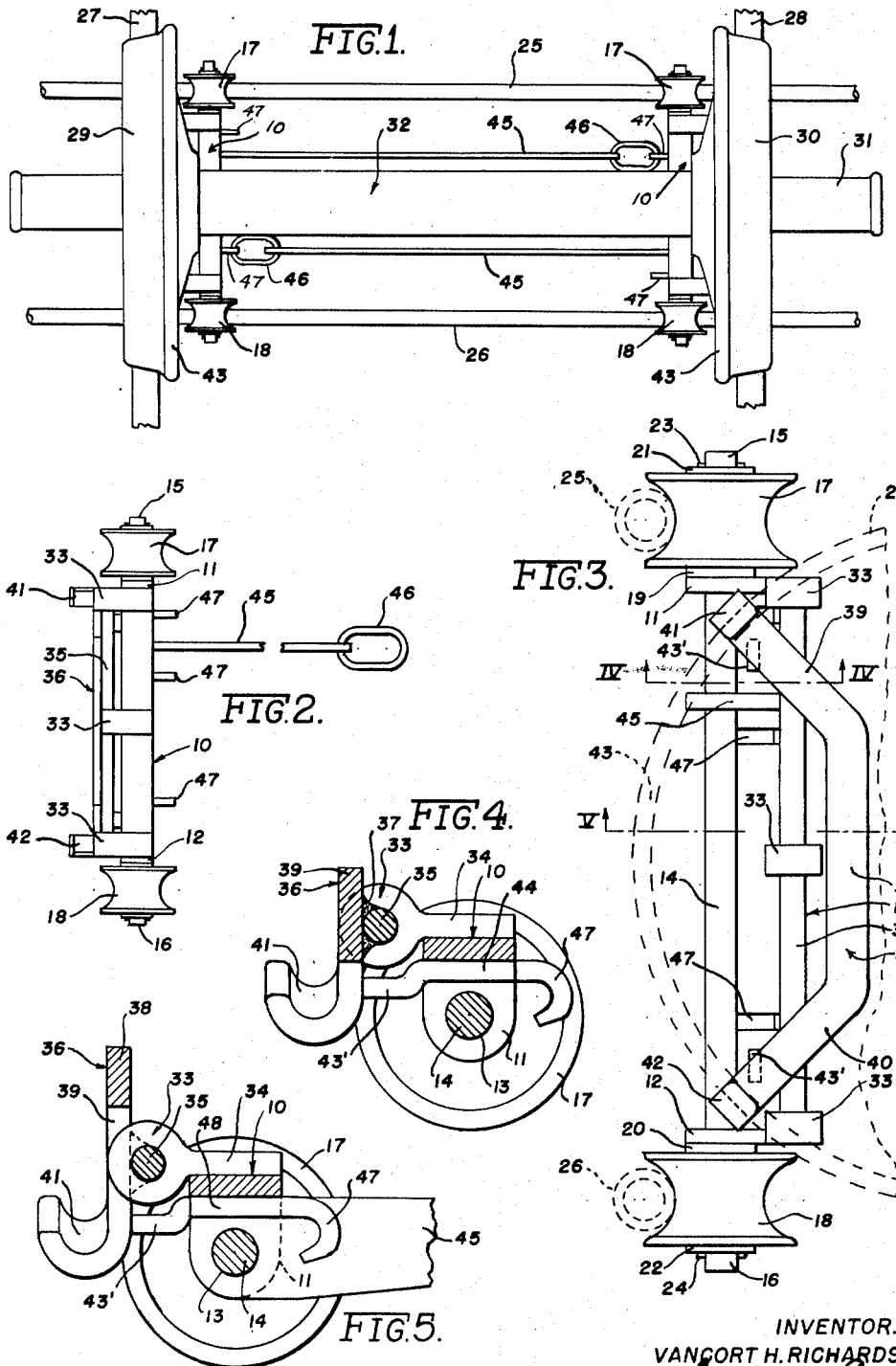

INVENTOR.
VANCORT H. RICHARDS.
BY Harry C. Hewits
ATTORNEY.

Patented Feb. 3, 1953

2,627,234

UNITED STATES PATENT OFFICE 2,627,234

DOLLY TRUCK AND THE LIKE

Vancort H. Richards, Minot, N. Dak.

Application August 27, 1945, Serial No. 612,850

9 Claims. (Cl. 104—32)

1

This invention relates to dolly trucks and the like and more particularly to railroad truck lever dollies, although certain features thereof may be employed with equal advantage for other purposes.

It contemplates more especially the provision of a simple, improved and more effective dolly structure to elevate railroad trucks and the like and for their traverse over a predetermined path, preferably though not essentially, outlined by tracks in order to expedite the removal and replacement of railroad trucks and wheels.

The problem of removing railroad trucks and wheels from car chassis normally entails a great deal of time and labor owing to the immense weights involved, to elevate them from the track and effect their displacement to a point of storage and/or repair depot as well as effect their replacement for operative association with a car chassis, is complicated by the very heavy loads involved. These appreciable weights entail a great many man hours of labor and time merely in their preparation for repair and replacement. The time element as well as the man hours involved in these operations may be appreciably reduced by resort to lever dollies which are capable of lifting the railroad trucks from the track and transporting them transversely thereof along a predetermined path preferably outlined by tracks which cooperate with wheels rotatably journalled on the dolly chassis.

This has proven exceptionally effective in removing separate trucks or completely assembled trucks from passenger as well as freight car structures for transfer to storage or repair depots and to effect their replacement for operative attachment to the railroad car chassis.

One object of the present invention is to simplify the construction and improve the operation of devices of the character mentioned.

Another object is to provide an improved wheeled railroad truck dolly structure that is capable of raising or lowering axles of trucks and fully assembled truck chassis relative to the rails for transfer to and therefrom for storage, repair and/or replacement.

Still another object is to provide a simple dolly truck having a lever moment arm for effectively raising and lowering heavy wheeled trucks with minimum entailment of labor and time.

A further object is to provide a lever dolly for railroad car trucks so that they may be utilized in pairs for raising, lowering and transferring railroad car trucks and complete assemblies relative to rails wherein they normally traverse.

A still further object is to provide an axle

2 member with wheels having railroad car wheel engaging expedients thereon in combination with a moment arm lever to raise or lower a complete truck or any part thereof relative to the rails wherein they normally traverse.

Still a further object is to provide two wheeled lever dollies for railroad trucks and the like for utilization in pairs to support an assembled freight car truck with or without brake riggings and other associated elements.

Other objects and advantages will appear from the following description of an illustrative embodiment of the present invention.

In the drawings:

Figure 1 is a plan view of a pair of lever dollies in conjunction with a railroad car truck illustrating the utilization thereof in accordance with teachings of the present invention.

Figure 2 is a fragmentary plan view of a lever dolly truck embodying features of the present invention.

Figure 3 is an enlarged front end view in elevation of the lever dolly embodying features of the present invention.

Figure 4 is a fragmentary sectional view taken substantially along line IV—IV of Figure 3.

Figure 5 is a fragmentary sectional view taken substantially along line V—V of Figure 3.

Figure 6:
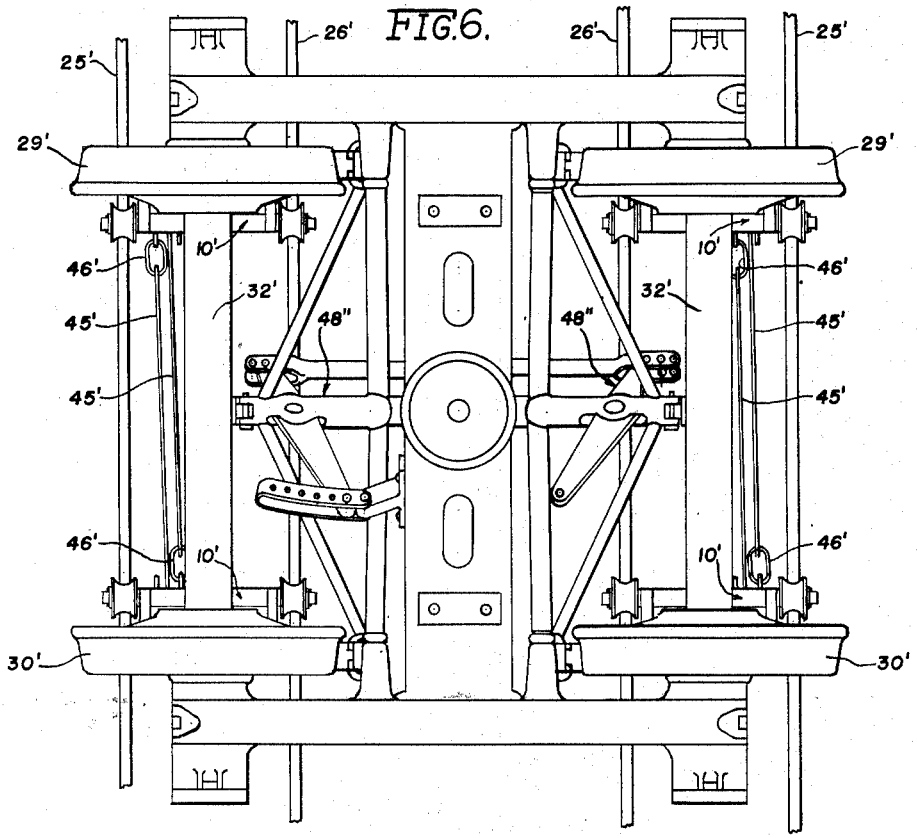
Figure 6 is a plan view of an assembled freight car truck with brake riggings and associated elements supported on two pairs of right and left lever dollies embodying features of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice.

The present embodiment comprises an elongated frame member 10 which consists of a substantially rectangular steel plate with its flat plane disposed horizontally to provide depending end brackets 11—12. The depending end brackets 11—12 are provided with horizontally aligned bores 13 (Figures 4 and 5) to receive a shaft 14 therethrough for fixed support thereon with projecting extremities 15—16 to receive axle supporting wheels 17—18 journalled thereon.

The dolly axle supporting wheels 17—18 are retained on the axle 14 against washers 19—20 which are interposed between the depending frame member brackets 11—12 to space the wheels 17—18 therefrom. The wheels 17—18 are retained on the projecting axle extremities 15—16 by means of washers 21—22 in conjunction with cotter pins 23—24 to extend diametrically through the axle ends 15—16 (Figure 3).

It should be noted that the wheels 17—18 have, in this instance, concave treads which are complements of cylindrical rails 25—26 that are disposed transversely over the standard and conventional railroad tracks 27—28 to serve to support the wheels 29—30 journalled on axle 31 that extend through axle housing 32 comprising a singular wheel and axle assembly of a freight car or passenger railroad truck.

In order to readily remove the axle assembly 32 of a railroad car truck after the car body has been detached, elevated and removed, the dollies are used in pairs so that their wheels 17—18 can traverse the transverse rails 25—26 after the axle assembly 32 has been elevated and is free to traverse transversely of the tracks 27—28.

In order to effectively raise and lower the wheels 29—30, together with the axle 31 and the axle housing 32, the frame member 10 has a plurality of journal bearings 33, in this instance three, provided with arms 34 for welded or other suitable permanent attachment to the top surface of the dolly frame member 10 at the ends thereof and intermediate the ends to provide a three point bearing support for an axle 35 journalled therein.

The axle 35 has a wheel receiving and supporting bracket 36 welded or otherwise attached thereto as at 37 (see Figure 4) to provide a horizontal portion 38 and downwardly divergent arms 39—40 which terminate in arcuately shaped hooks 41 and 42 which are complemental to the enlarged peripheral flange 43 of the railroad car truck wheels 29—30 to effectively engage and support the wheels 29—30 thereon.

With the above arrangement of parts, it should be observed that the railroad car wheel supporting bracket 36 will be permitted to pivot by its axis 35 relative to the frame member 10 within the limits of a horizontal stop 43', in this instance two, which are offset downwardly from a plate member 44 which are welded or otherwise attached to the underside of the frame member 10. The stops 43' (Figures 3 and 4) serve to limit the counterclockwise pivotal displacement of the railroad car wheel supporting bracket 36 which will assume a vertical position when the dolly truck frame member 10 is in its true horizontal plane.

In order to enable the dolly frame member 10 to be tilted and a moment arm action applied thereto so that large weights may be elevated by tilting the dolly frame member 10 in a clockwise direction (viewed from Figures 4 and 5) an elongated lever 45 is attached to the frame member 10 and anchored to the axle 35 (Figure 3) for positioning proximate to one end of the frame member 10 to extend normally thereof.

The dolly frame lever 45 extends for a distance approaching the other confronting wheels of a railroad car axle assembly 32 so that pairs of dolly frames 10 disposed oppositely each other and interconnected may support the entire railroad car axle assembly 32 as illustrated in Figure 1. This calls for the provision of complemental interengaging members between the frame 10 and the lever 45 of oppositely disposed dolly units.

In the present embodiment, the complemental interengaging elements of a closed loop 46 that is connected to the free extremity of the lever 45 engages one of a plurality of downwardly extending open hooks 47, in this instance three, having arms 48 welded or other suitable attachment to the underside of the dolly frame member 10. It will be apparent from the foregoing description that the lever 45 may be manually manipulated to present a highly advantageous moment arm to the frame member 10 so that a railroad car wheel receiving and supporting bracket 36 can be pivoted relative to the frame member 10 by merely lifting the lever 45 in a counterclockwise direction (viewed from Figure 5). This will tilt the frame 10 relative to the railroad car wheel receiving and supporting bracket 36 which will thus be lowered owing to the corresponding displacement of the axle 35 with the axle 14 as an axis of pivotal displacement.

This will dispose the wheel receiving and supporting bracket 36 to engage underneath the wheels 29 or 30 so that the reversed clockwise displacement of the lever 45 (viewed from Figure 5) will elevate the wheel 29 from its rail 27 and above the transverse rails 25—26 for free displacement therealong. Before displacement is effected, however, the other wheel 30 of the axle assembly 32 is similarly raised with another dolly unit of identical construction with the lever 45 extending toward the first dolly unit.

As a result, the closed loops 46 at the end of each of the levers 45 can be engaged with a confronting hook 47 so that the dolly units are interconnected as a pair to enable the free traverse of the axle assembly 32 over the transverse rails 25—26 which may lead to storage or repair depots. The axle assembly 32 can be readily lowered by detaching the loops 46 from the hooks 47 and permitting the dolly to tilt in a counterclockwise direction (viewed from Figure 5).

Figure 7:
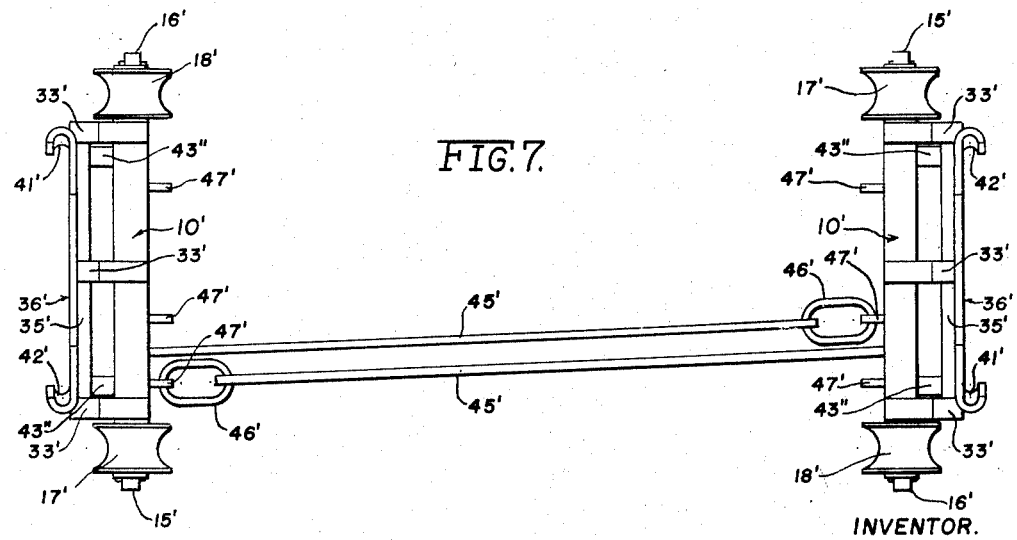
Figure 7 is a plan view of a pair of right and left lever dollies embodying features of the present invention and illustrating the arrangement of the dollies for carrying assembled trucks as set forth in Figure 6.

When it is desired to correspondingly manipulate an entire assembled freight or passenger car truck involving 4 wheels or a pair of axle assemblies 32' (Figure 6) with all of the brake riggings 48" and associated elements, similar dolly units are employed in double pairs except that the levers 45' (Figure 7) of each pair of dolly units 10' should preferably be oppositely positioned with respect to the frame member 10' to constitute right and left dolly units so that the dolly levers 45' of each pair will be free of the brake riggings that otherwise would foul the levers 45' were the corresponding units employed in reverse as illustrated in Figure 1.

Except for this change and the use of double pairs of dolly units, the manipulation of the entire assembled freight or passenger car truck is similar to the manipulation of a single or independent wheel axle assembly 32.

With the arrangement of parts above described, it will be apparent that a very simple, effective and efficient dolly has been provided for manipulating and handling freight and passenger car axle truck assemblies with minimum entailment of labor and time so that they can be transported to and from the regular tracks for attachment and detachment from the railroad cars for service and replacement depending upon the dictates and requirements of commercial practice.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a dolly unit for wheel lifting and use in opposed pairs for transporting a vehicle axle and its wheels, the combination with an elongated transverse frame member, of a lever member extending normally from said frame member, aligned wheels journalled in said frame member to movably support a load thereon for traverse over a supporting surface, and vehicle wheel supporting means movably associated with said frame member and positioned forwardly thereof and beyond said aligned frame wheels to provide for the vertical displacement of engageable vehicle wheels whereby the latter with their axle may be elevated and lowered relative to a supporting surface responsive to utilizing said lever member as a moment arm with said aligned frame wheels serving as a pivotal axis therefor, said vehicle wheel suporting means projecting forwardly of said frame member and said aligned frame supporting wheels in all operable positions of said frame and lever members.

2. In a dolly unit for wheel lifting and use in opposed pairs for transporting a vehicle axle and its wheels, the combination with an elongated transverse frame member, of a lever member extending normally from said frame member, aligned wheels journalled in depending brackets fixed to said frame member to movably support a load thereon for traverse over a supporting surface, vehicle wheel supporting means pivotaly associated with said frame member and projecting forwardly thereof and beyond said aligned frame wheels to provide for the vertical displacement of engageable vehicle wheels, whereby the latter with their axle may be elevated and lowered relative to a supporting surface responsive to utilizing said lever member as a moment arm with said aligned frame wheels serving as a pivotal axis therefor, and complemental attaching means on said frame and lever members to enable the opposed reverse connection of lever and frame members from separate units for use in pairs to support a double axle truck thereon.

3. In a dolly unit for wheel lifting and use in opposed pairs for transporting a vehicle axle and its wheels, the combination with an elongated transverse frame member, of a lever member extending normally from said frame member proximate to one end of said frame, aligned wheels journalled on depending brackets fixed to said frame member to movably support a load thereon for traverse over a supporting surface, and arcuate vehicle wheel supporting means pivotally mounted on said frame member and projecting forwardly thereof and beyond said aligned frame wheels to provide for the vertical displacement of engageable vehicle wheels, whereby the latter with their axle may be elevated and lowered relative to a supporting surface responsive to utilizing said lever member as a moment arm with said aligned frame wheels serving as a pivotal axis therefor, said vehicle wheel suporting means projecting forwardly of said frame member and said aligned frame supporting wheels in all operable positions of said frame and lever members.

4. In a dolly unit for wheel lifting and use in opposed pairs for transporting a vehicle axle and its wheels, the combination with an elongated transverse frame member, of a lever member extending normally from said frame member proximate to one end of said frame, aligned wheels journalled on depending brackets fixed to said frame member to movably support a load thereon for traverse over a supporting surface, arcuate vehicle wheel supporting means pivotally mounted on said frame member and projecting forwardly thereof and beyond said aligned frame wheels to provide for the vertical displacement of engageable vehicle wheels, whereby the latter with their axle may be elevated and lowered relative to a supporting surface responsive to utilizing said lever member as a moment arm with said aligned frame wheels serving as a pivotal axis therefor, and complemental attaching means on said frame and lever members to enable the opposed reverse connection of lever and frame members from separate units for use in pairs to support a double axle truck thereon, said vehicle wheel supporting means projecting forwardly of said frame member and said aligned frame supporting wheels in all operable positions of said frame and lever members.

5. In a dolly unit for wheel lifting and use in opposed pairs for transporting a vehicle axle and its wheels, the combination with an elongated transverse frame member, of a lever member extending normally from said frame member proximate to one end thereof, a shaft extending along said frame member, traction wheels journalled on said shaft to support said frame and lever members on tracks for movement therealong, and vehicle supporting means pivotally mounted on said frame member to extend forwardly beyond said frame and traction wheels in all operable positions thereof to ascend and descend relative to and with said frame member as an axis and said lever member as a moment arm for manually exerting a substantial lifting force.

6. In a dolly unit for wheel lifting and use in opposed pairs for transporting a vehicle axle and its wheels, the combination with an elongated transverse frame member, of a lever member extending normally from said frame member proximate to one end thereof, a shaft extending along said frame member, traction wheels journalled on said shaft to support said frame and lever members on tracks for movement therealong, vehicle supporting means pivotally mounted on said frame member to extend forwardly beyond said frame and traction wheels in all operable positions thereof to ascend and descend relative to and with said frame member as an axis and said lever member as a moment arm for manually exerting a substantial lifting force, said lever member being attached to said frame member proximate one end thereof, and lever fastener means on said frame to enable the opposed reverse association of a pair of frame and lever members to support a double axle truck thereon.

7. In a dolly unit for wheel lifting and use in opposed pairs for transporting a vehicle axle and its wheels, the combination with an elongated transverse frame member, of a lever member extending normally from said frame member proximate to one end thereof, a shaft extending along said frame member, traction wheels journalled on said shaft to support said frame and lever members on tracks for movement therealong, vehicle supporting means pivotally mounted on said frame member to extend forwardly beyond said frame and traction wheels in all operable positions thereof to ascend and descend relative to and with said frame member as an axis and said lever member as a moment arm for manually exerting a substantial lifting force, said lever member being attached to said frame member proximate one end thereof to enable the opposed reverse association of a pair of frame and lever members, and complemental attaching means on said frame and lever members to enable the connection of lever and frame members from separate opposed units to support a double axle truck thereon.

8. In a dolly unit for wheel lifting and use in opposed pairs for transporting a vehicle axle and its wheels, the combination with an elongated transverse frame member, of a lever member extending normally from said frame member, a shaft extending along said frame member, traction wheels journalled on said shaft to movably support said frame and lever members, another shaft journalled on said frame member forwardly of said last named shaft, and arcuate vehicle wheel receiving supports on said last named shaft having limited oscillatory freedom, said last named means being positioned forwardly of said frame member and beyond said traction wheels to engage and disengage a single axle wheel for ascent and descent responsive to utilizing said lever member as a moment arm, said vehicle wheel supporting means projecting forwardly of said frame member and said aligned frame supporting wheels in all operable positions of said frame and lever members.

9. In a dolly unit for wheel lifting and use in opposed pairs for transporting a vehicle axle and its wheels, the combination with an elongated frame member, of a lever member extending normally from said frame member, a shaft extending along said frame member, traction wheels journalled on said shaft to movably support said frame and lever members, another shaft journalled on said frame member, arcuate vehicle wheel receiving supports on said last named shaft having limited oscillatory freedom, said last named means being positioned forwardly of said frame member and beyond said traction wheels to engage and disengage a single axle wheel for ascent and descent responsive to utilizing said lever member as a moment arm, and complemental attaching means on said frame and lever members to enable the connection of lever and frame members from separate opposed units to support a double axle truck thereon.

VANCORT H. RICHARDS.

REFERENCES CITED

The following references are of record in the file of this patent:

UNITED STATES PATENTS

| Number | Name | Date |
|---|---|---|
| 416,990 | Campbell | Dec. 10, 1899 |
| 682,647 | Scullin | Sept. 17, 1901 |
| 967,040 | McWane et al. | Aug. 9, 1910 |
| 1,299,829 | Goodyear | Apr. 8, 1919 |
| 1,843,968 | Bellows | Feb. 9, 1932 |
| 2,166,609 | Putnam | July 18, 1939 |
| 2,207,443 | Schneider | July 9, 1940 |
| 2,393,602 | Baum | Jan. 29, 1946 |
| 2,398,584 | Goodrich | Apr. 16, 1946 |

FOREIGN PATENTS

| Number | Country | Date |
|---|---|---|
| 324,938 | Germany | Sept. 8, 1920 |
| 320,796 | Great Britain | Oct. 24, 1929 |